United States Patent
Kraft et al.

[11] Patent Number: 5,947,496
[45] Date of Patent: Sep. 7, 1999

[54] LOW LASH IDLER ARM ASSEMBLY

[75] Inventors: Kenneth G. Kraft, Warren; Jeffrey L. Kincaid, Clarkston, both of Mich.

[73] Assignee: American Axle & Manufacturing, Inc., Detroit, Mich.

[21] Appl. No.: 08/942,512

[22] Filed: Oct. 2, 1997

Related U.S. Application Data

[60] Provisional application No. 60/045,467, May 2, 1997.

[51] Int. Cl.[6] .................................................... B62D 7/00
[52] U.S. Cl. ................ 280/93.508; 384/147; 384/296; 403/163; 74/579 F
[58] Field of Search ................ 280/93.508, 93.507, 280/93.509; 384/147, 153, 296, 300, 279; 403/163, 162; 74/579 F

[56] References Cited

U.S. PATENT DOCUMENTS

| | | | |
|---|---|---|---|
| 2,544,582 | 3/1951 | Booth | 280/93.508 |
| 3,055,688 | 9/1962 | Melton et al. | 280/93.508 |
| 3,072,448 | 1/1963 | Melton et al. | 280/93.508 |
| 3,111,334 | 11/1963 | Krizman | 280/93.508 |
| 3,124,394 | 3/1964 | Rowlett | 280/93.508 |
| 3,133,743 | 5/1964 | Mullin | 280/93.508 |
| 3,220,756 | 11/1965 | Templeton | 384/147 |
| 3,361,459 | 1/1968 | Marquis et al. | 280/93.508 |
| 3,495,859 | 2/1970 | Hassan | 280/93.508 |

*Primary Examiner*—Peter C. English
*Attorney, Agent, or Firm*—Harness, Dickey & Pierce, P.L.C.

[57] ABSTRACT

A low lash idler arm assembly includes upper and lower bushings which are provided for supporting a hub of an idler arm on a support member. The assembly uses the engagement of a flange nut onto the support member to axially position the bushings in their final position.

14 Claims, 2 Drawing Sheets

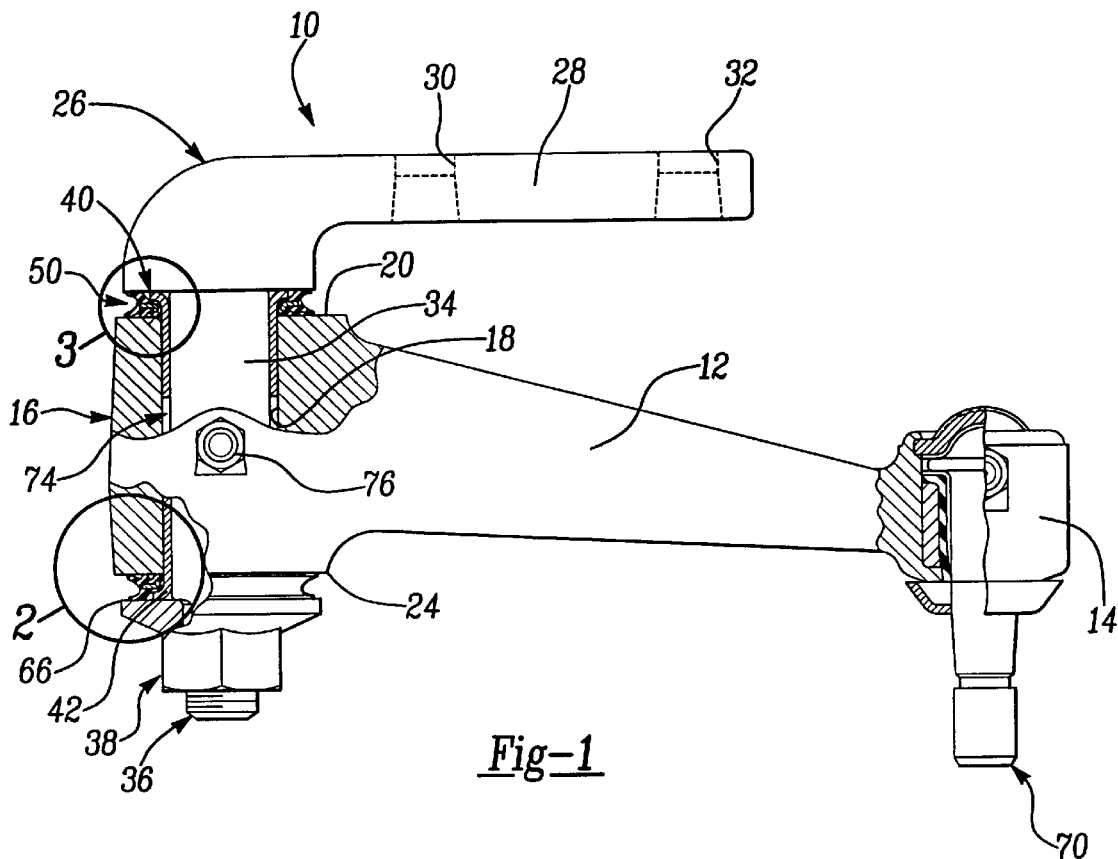
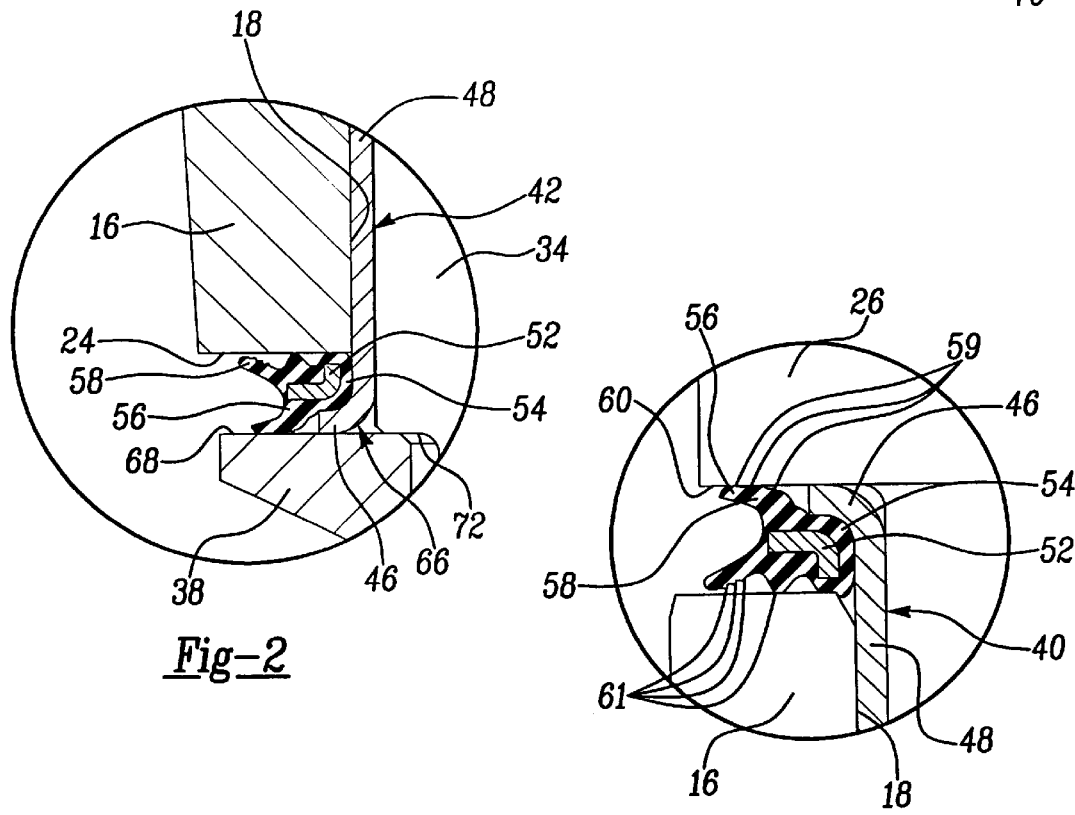

LOW LASH IDLER ARM ASSEMBLY

This application claims the benefit of U.S. Provisional Application No. 60/045,467, filed May 2, 1997.

BACKGROUND OF THE INVENTION

1. Field of the Invention

The present invention relates to a vehicle front wheel suspension construction and more particularly to an idler arm structure and improved bearing assembly for use in the wheel suspension construction.

2. Background of the Invention

In conventional application, the idler arm of a steering linkage is ideally pivotally mounted on vehicle superstructure in such a way as to provide free rotation about a fixed axis. For optimum geometric accuracy, the bearing which establishes the axis of rotation should completely resist any tendency of the idler arm to deflect in any plane other than one normal to the axis of a fixed pivot. Performance factors typically analyzed for the idler arm joint include torque, lash, and long term durability. The torque of an idler arm joint, commonly referred to as functional torque, is the torque necessary for pivoting the idler arm about the support. Lash is the axial movement of the idler arm relative to the support while durability deals with the normal tendency of an idler arm joint to wear in use such that a degree of slackness gradually arises which tends to reduce the accuracy of the steering geometry.

Attempts have been made to utilize plastic bearings in the idler arm joints. One common problem with the plastic bearings is the loss of press-fit which leads to premature wear, lash, and sealing problems. The tendency for plastic to creep under stress causes the loss of the press-fit. The stress is caused by steering loads and by the press-fit itself.

The use of compression springs to take up axial lash has also been utilized in prior idler arm joints. The main problem with using springs to take up axial lash is obtaining a spring that is stiff enough not to deflect under loading, but forgiving enough to provide consistent torque. Another problem exists in locating a bearing surface for the spring.

Other attempts have been made at using a nut and a corresponding assembly torque to axially de-lash an idler arm joint. This method has been proven both analytically and experimentally very difficult to control torque. This is in large part due to the small variations in nut assembly torque which cause large variations in functional joint torque. Another problem with this method is nut retention. The nut assembly torque must be very low in order to maintain low idler arm functional torque. Since the assembly torque is too low to generate the proper thread stress and clamping forces, additional means of maintaining nut retention need to be added. This leads to very complicated designs.

SUMMARY OF THE INVENTION

Accordingly, it is an object of the present invention to provide a low lash, low torque steering linkage idler arm joint. The present invention utilizes steel-backed composite, flanged journal bushings, which are press-fit into the idler arm. The unique method which is utilized eliminates axial joint lash while maintaining a consistent and low turning torque. The present invention uses the assembly of the flange nut onto the idler shaft support member to axially position the bushings in their final position. This method eliminates the negative effects of axial dimensional stack-up variations that can lead to inconsistency in turning torque.

The composite bushings provided according to the present invention have a higher unit loading capability and reduced coefficient of friction as compared to the plastic bushings conventionally used. A main advantage of the composite bushings utilized with the present invention is that they will not lose their press-fit during their service life.

The present invention utilizes seals which act somewhat as springs as they support the flanged journal bushings. The compressed seals are stiff enough under compression not to deflect under loading, but forgiving enough to provide consistent functional torque.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein:

FIG. 1 is side-elevational view, partly in section with parts broken away, of an idler arm assembly according to the principles of the present invention;

FIG. 2 is an expanded sectional view of area 2 as shown in FIG. 1, illustrating the lower seal assembly;

FIG. 3 is an expanded sectional view of area 3 as shown in FIG. 1, illustrating the upper seal assembly;

DETAILED DESCRIPTION OF THE PREFERRED EMBODIMENTS

Figure 4:
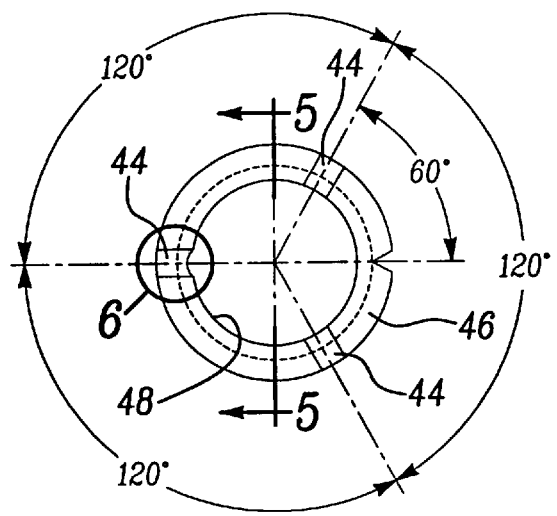
FIG. 4 is a plan view of a bushing according to the present invention.

With reference to FIGS. 1–6, the idler arm assembly 10 of the present invention will be described. The idler arm assembly 10 includes an idler arm 12 having a free end 14 and a hub 16 at the other end thereof. The hub 16 includes a straight cylindrical bore 18 which terminates in annular surfaces 20 and 24 at the top and bottom, respectively, of the hub 16.

The idler arm 12 is mounted to a support 26. Support 26 includes a bracket portion 28 provided with mounting holes 30, 32 provided for mounting the support 26 to the vehicle. Support 26 also includes a bolt portion 34 which is provided with a threaded end portion 36 which receives a flange nut 38 thereon.

Figure 5:
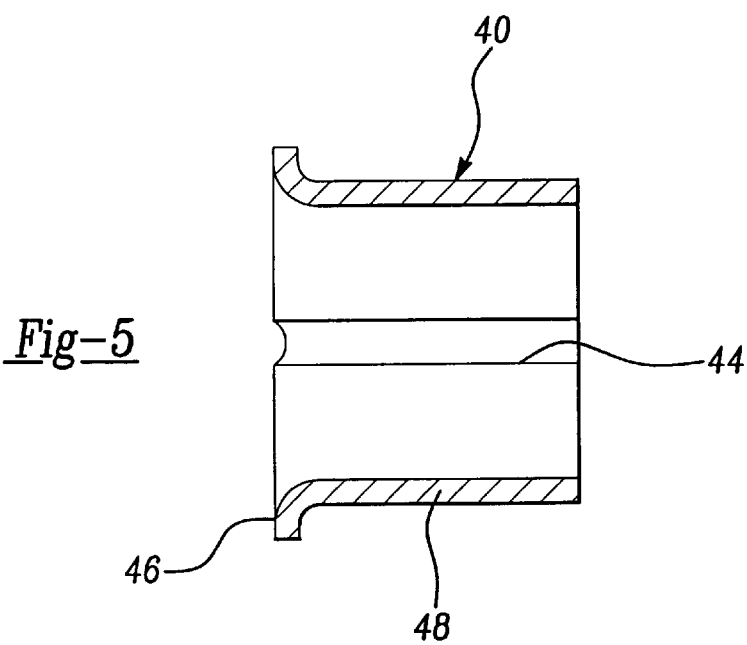
FIG. 5 is a cross-sectional view of the bushing taken along line 5—5 of FIG. 4.
Figure 6:
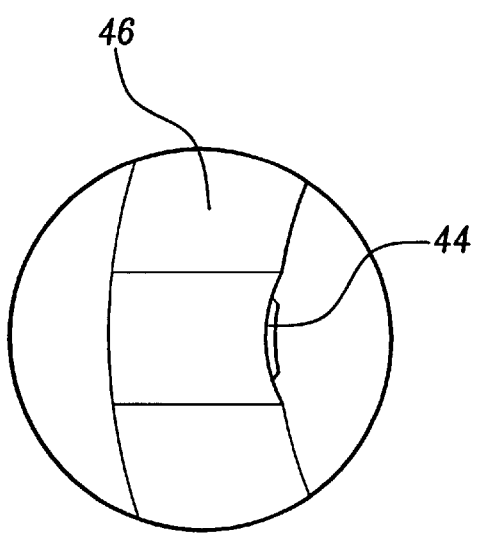
FIG. 6 is a detailed enlarged view of the area 6 as shown in FIG. 4.

Upper and lower bushings 40, 42 are press-fit into cylindrical bore 18. The bolt portion 34 of support 26 is inserted through upper and lower bushings 40, 42. Upper and lower bushings 40, 42 are provided with grooves 44, as best seen in FIGS. 4–6, which help provide an adequate supply of lubricant to the bushings. The number of grooves 44 can be varied. As shown in FIG. 4, three grooves 44 are provided in the bushing 40, each spaced 120 degrees from one another. The bushings 40, 42 are each provided with a flange 46 which extends radially outward from the cylindrical body 48.

According to a preferred embodiment of the present invention, the bushings 40, 42 are formed of three main elements that form a steel-backed composite. The bushings 40 include a steel backing which gives the composite bushing material high load carrying capacity. The steel backing also allows a thin, compact design including excellent heat dissipation and dimensional and structural rigidity. The bushings 40, 42 are provided with a porous bronze inner structure. The porous bronze inner structure includes a layer of carefully sized bearing quality bronze powder which is sintered onto the steel backing. The porous bronze inner structure is then impregnated with a homogeneous mixture of polytetrafluorolethylene (PTFE) and lead. In addition to providing maximum thermal conductivity away from the bearing surface, the unique inner structure serves as a reservoir for the PTFE-lead mixture. The PTFE-lead overlay provides an initial transfer film which effectively coats the mating surface of the bearing assembly, forming an oxide-type lubricant film. As the film is depleted, the relative motion of the mating surface continues to draw material from the porous bronze layer. When conditions are severe, the feed of lubrication is increased. The peaks of bronze coming in contact with the mating surface generate localized heat. This, due to the high thermal expansion rate of the PTFE, forces additional lubricant to the bearing surface. The relative motion of the mating parts wipes the lubricant over the interface, continuously restoring the low friction surface film. The steel-backed composite used for bushings 40, 42 is commercially available from Garlock Bearings, Inc.

An upper seal assembly 50 is provided between the flange 46 of upper bushing 40 and top surface 20 of idler arm 12. Upper seal assembly 50 is provided with a steel reinforcement ring 52 which is covered with an elastomeric portion 54. Elastomeric portion 54 includes a body portion which surrounds reinforcement ring 52 and two radially extending sealing portions 56, 58. Sealing portion 56 is provided with a plurality of serrated ribs 59 which engage an annular surface 60 of support 26. Seal portion 58 of upper seal assembly 50 is similarly provided with serrated ridges 61 which engage the top surface of idler arm hub 16. In assembly, the steel reinforcement ring 52 is disposed between the flange 46 of upper bushing 40 and top surface 20 of idler arm hub 16.

With reference to FIG. 2, a lower seal assembly 66 is provided with the same configuration as the upper seal assembly 50. Accordingly, a detailed description of lower seal assembly 66 is unnecessary except to note that seal portion 56 is disposed against an upper surface 68 of flange nut 38, and seal portion 58 is disposed against bottom surface 24 of idler arm hub 16. Further, steel enforcement ring 52 is disposed between the flange 46 of lower bushing 42 and bottom surface 24 of idler arm hub portion 16.

Free end 14 of idler arm 12 supports a stud member 70 which is connected to an intermediate link of a steering system, not shown.

During assembly, the upper seal assembly 50 is slid over the cylindrical body 48 of upper bushing 40 so that the seal assembly 50 is disposed next to flange 46. The upper bushing is then press-fit into the cylindrical bore 18 of idler arm hub 16. Approximately 800 pounds of force is necessary to press-fit the upper composite bushing 40 into the cylindrical bore 18. The lower seal assembly 66 is slid over the cylindrical body 48 of lower bushing 42 so that the lower seal assembly 66 is disposed next to the flange 46. The lower bushing 42 is then partially inserted into the cylindrical bore 18 of idler arm hub 16. The bolt portion 34 of support 26 is then inserted into the cylindrical bore 18 so that the annular surface 60 of support 26 is disposed against seal portion 56 of upper seal assembly 50. The flange nut 38 is then threadedly engaged with the threaded end portion 36 of bolt portion 34. The flange nut 38 is tightened until the upper surface 68 of flange nut 38 engages a shoulder 72 (as shown in FIG. 2) of bolt portion 34. Shoulder 72 is provided with a generally flat surface. As the flange nut 38 is tightened, the lower bushing 42 is continually pressed into cylindrical bore 18. When the upper surface 68 of flange nut 38 engages the shoulder 72 of bolt portion 34, the upper and lower bushings 40, 42 are automatically assembled to their final position. The use of the assembly of the flange nut 38 to axially position the upper and lower bushings in their final position eliminates axial joint lash while maintaining a consistent and low turning torque. After the flange nut 38 is assembled to engage the shoulder 72 of bolt portion 34, the exposed threads of the threaded end portion 36 are deformed in order to prevent the disassembly of the joint.

In the assembled condition, a fill cavity 74 is provided around the periphery of the bolt portion 34, as shown in FIG. 1. A lubricant fitting 76 is provided in communication with the fill cavity 74. Lubricant is delivered to the fill cavity 74 via the lubricant fitting 76. From the fill cavity 74, lubricant passes through the grooves 44 provided in the bushings 40, 42 so that the bearing surface is properly lubricated. The lubricant is continually inserted until grease purges at the top and bottom of the joint assembly.

The present invention utilizes a unique method which totally eliminates axial joint lash while maintaining a consistent and low turning torque. The method provides for the assembly of the flange nut onto the bolt portion to axially position the bushings in their final position. This method eliminates the negative effects of axial dimensional stack-up variations which result in inconsistent functional torque.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An idler arm assembly for a vehicle comprising:
   an idler arm including a hub having a cylindrical bore which terminates at a top surface and a bottom surface of said hub;
   an upper bushing and a lower bushing press fit into opposite ends of said cylindrical bore for pivotally supporting said idler arm;
   a support member having a bolt portion received in said upper and lower bushings, said bolt portion including a threaded end portion; and
   a nut member threadedly engaged with said threaded end portion of said bolt portion; and
   an upper seal assembly disposed between the top surface of said hub and a flange of said upper bushing and a lower seal assembly disposed between the bottom surface of said hub and a flange of said lower bushing.

2. The idler arm assembly of claim 1 wherein said bolt portion of said support member includes a shoulder for locating said final position of said nut member.

3. The idler arm assembly of claim 1, wherein said upper and lower bushings are steel-backed composite bushings with a porous bronze inner structure.

4. The idler arm assembly of claim 3, wherein said porous bronze inner structure is impregnated with a mixture of polytetrafluoroethylene and lead.

5. An idler arm assembly for a vehicle comprising:

an idler arm including a hub having a cylindrical bore which terminates at a top surface and a bottom surface of said hub;

an upper bushing and a lower bushing press fit into opposite ends of said cylindrical bore for pivotally supporting said idler arm;

a support member having a bolt portion received in said upper and lower bushings, said bolt portion including a threaded end portion; and a nut member threadedly engaged with said threaded end portion of said bolt portion;

an upper seal assembly and lower seal assembly each having a reinforcement ring and an elastomeric portion, said elastomeric portion having two radially extending sealing portions;

said upper seal assembly being disposed between said top surface of said hub and a radially extending flange of said upper bushing wherein one of said two sealing portions engages said top surface of said hub and a second of said two sealing portions engages an annular surface of said support member; and said lower seal assembly being disposed between said bottom surface of said hub and a radially extending flange of said lower bushing wherein one of said two sealing portions engages said bottom surface of said hub and a second of said two sealing portions engages an upper surface of said nut member.

6. The idler arm assembly of claim 5, wherein a fill cavity is located around a periphery of said bolt portion of said support member, said idler arm including a lubricant fitting in communication with said fill cavity.

7. The idler arm assembly of claim 6, wherein said upper and lower bushings each include at least one groove for allowing lubricant to be transferred to a bearing surface of a cylindrical body of the respective bushing.

8. A method of assembling a low lash idler arm comprising the steps of:

inserting a cylindrical body of an upper bushing through an upper seal assembly;

inserting a cylindrical body of a lower bushing through a lower seal assembly;

press fitting the upper bushing into an upper portion of a cylindrical bore of an idler arm hub;

press fitting the lower bushing into a lower portion of said cylindrical bore of said idler arm hub;

inserting a bolt portion of a support member into said upper and lower bushings; and threadedly engaging a nut member on a threaded end portion of said bolt portion until said upper bushing and lower bushing are each located in a respective final position.

9. The method according to claim 8, wherein at least one of said upper and lower bushings is initially fully inserted into said cylindrical bore of said hub.

10. The method according to claim 8, wherein an upper surface of said nut member engages a shoulder of said bolt portion of said support member when said upper bushing and said lower bushing are in said final positions.

11. The method according to claim 8, wherein said upper bushing and said lower bushing are steel-backed composite bushings with a porous bronze inner structure.

12. The method according to claim 11, wherein said porous bronze inner structure is impregnated with a mixture of polytetrafluoroethylene and lead.

13. The method according to claim 8, wherein said nut member is secured to the threaded end portion of said support to prevent disassembly.

14. An idler arm assembly comprising:

an idler arm having a first surface, a second surface, and a bore extending between said first and second surfaces;

a first bushing having a first end retained in said bore and a second end extending outwardly from said first surface;

a second bushing having a first end retained in said bore and a second end extending outwardly from said second surface;

a support member including a first portion and a second portion extending from said first portion and having a threaded end portion, said second portion extending through said first and second bushings such that said first portion engages said second end of said first bushing and said threaded end portion extends outwardly from said second end of said second bushing;

a nut threaded onto said threaded end portion of said second portion and engaging said second end of said second bushing, said nut being threadably tightened to a predetermined position on said threaded end portion such that said idler arm is restrained axially relative to said first portion of said support member while being permitted to pivot about said second portion thereof;

wherein said first portion of said support member is a bracket portion and said second portion is a bolt portion extending from a surface of said bracket portion, said second end of said first bushing engages said surface of said bracket portion, and wherein said nut has a surface adapted to engage said second end of said second bushing; and wherein said threaded end portion extends from a shoulder of said bolt portion, said nut being tightened onto said threaded end portion until said surface of said nut engages said shoulder of said bolt, thereby defining said predetermined position.

* * * * *